(12) United States Patent
Vandervoet

(10) Patent No.: US 7,748,350 B2
(45) Date of Patent: Jul. 6, 2010

(54) DEVICE FOR GROOMING THE COATS OF ANIMALS

(76) Inventor: Dorrie Vandervoet, 4513 A Russell Dr., Austin, TX (US) 78745

( * ) Notice: Subject to any disclaimer, the term of this patent is extended or adjusted under 35 U.S.C. 154(b) by 344 days.

(21) Appl. No.: 11/676,278

(22) Filed: Feb. 17, 2007

(65) Prior Publication Data

US 2007/0193529 A1    Aug. 23, 2007

Related U.S. Application Data

(60) Provisional application No. 60/774,161, filed on Feb. 17, 2006.

(51) Int. Cl.
*A01K 13/00* (2006.01)
(52) U.S. Cl. ..................................... 119/618
(58) Field of Classification Search ................ 119/613, 119/617, 618, 619, 620, 600; 15/236.05; 30/31, 30, 279.2, 280, 287, 294, 299; D28/52
See application file for complete search history.

(56) References Cited

U.S. PATENT DOCUMENTS

| | | | | |
|---|---|---|---|---|
| D187,744 S | * | 4/1960 | Mendenhall | D8/9 |
| 4,970,990 A | * | 11/1990 | Wilhelmi | 119/601 |
| 6,199,513 B1 | * | 3/2001 | Nichols | 119/625 |

\* cited by examiner

*Primary Examiner*—Timothy D Collins
*Assistant Examiner*—Valentina Xavier
(74) *Attorney, Agent, or Firm*—Lee & Hayes, PLLC

(57) ABSTRACT

An apparatus and blade assembly includes a first array of single-edged parallel metal blades, each blade in the first array having rounded ends with a sharpened interior curve, and a second array of parallel double-edged blades with a sharpened interior curve, both arrays being fixably attached such that the first array and the second array are sufficiently spaced to create a blade assembly. A two-sided blade assembly includes a first shorter projecting side including a first plurality of blades configured with interior cutting curves, the first plurality of blades including single-edged blades; and a second projecting side coupled to the first shorter projecting side, the second projecting side including a second plurality of blades having a decreased number of blades as compared to the first plurality of blades, each blade in the second plurality of blades being double-edged including a blade edge for the first shorter projecting side and a second blade edge configured for the second projecting side.

18 Claims, 6 Drawing Sheets

DEVICE FOR GROOMING THE COATS OF ANIMALS

CROSS REFERENCE TO RELATED APPLICATION

The present application derives priority from U.S. Provisional Patent Application 60/774,161 for "Pet Groomer", filed Feb. 17, 2006.

FIELD OF INVENTION

The present application relates generally to a grooming tool for animals.

BACKGROUND

Animals of all coat lengths need regular grooming to remove undercoats, to prevent shedding, to prevent the formation of mats, and to stimulate the production of natural oils. Heretofore, a variety of tools were necessary to accomplish these tasks. The patent to Frank A. Wilhelmi, U.S. Pat. No. 4,970,990 provides one of the tools known for matt removal. The Wilhelmi tool consists of individual blades in open tine structures with tines in two rows and is appropriate only for use on medium and longer coats.

SUMMARY

In one aspect, an apparatus includes but is not limited to a first array of single-edged parallel metal blades, each blade in the first array having rounded ends with a sharpened interior curve; and a second array of parallel double-edged blades with a sharpened interior curve, both arrays being fixably attached such that the first array and the second array are sufficiently spaced to create a blade assembly. In addition to the foregoing, other apparatus aspects are described in the claims, drawings, and text forming a part of the present application.

According to an embodiment, the blades of the second array and the first array can be directed toward opposing directions. Further, each blade can have a sharpened interior curve comprised of two converging cutting segments, each of the converging cutting segments with a sharpened apex. The first array and the second array of metal blades can be joined to form a single row. Alternatively, one or more of the first array and/or the second array of metal blades can include a blade end of approximately three-eighths of an inch in length for use on short coats; and one or more of the first array and/or the second array of metal blades can include a blade end of approximately five-eighths of an inch in length for use on medium and long coat.

In one embodiment, the first array and the second array can be combined to enable substantially more shorter length blades of the first array to be combined with a matching shorter length end of the double-edged blades of the second array to allow an increased number of shorter length blades as compared to longer length blades. In another aspect a twin blade assembly includes a first shorter projecting side including a first plurality of blades configured with interior cutting curves, the first plurality of blades including single-edged blades; and a second projecting side coupled to the first shorter projecting side, the second projecting side including a second plurality of blades having a decreased number of blades as compared to the first plurality of blades, each blade in the second plurality of blades being double-edged including a blade edge for the first shorter projecting side and a second blade edge configured for the second projecting side.

In another aspect, a two-sided blade assembly is provided including a first shorter projecting side including a first plurality of blades configured with interior cutting curves, the first plurality of blades including single-edged blades; and a second projecting side coupled to the first shorter projecting side, the second projecting side including a second plurality of blades having a decreased number of blades as compared to the first plurality of blades, each blade in the second plurality of blades being double-edged including a blade edge for the first shorter projecting side and a second blade edge configured for the second projecting side.

In one embodiment, the two-sided blade assembly can include a plurality of spacers inserted between each of the first plurality of blades and the second plurality of blades. Further, the two-sided blade assembly can be such that the first plurality of blades and the second plurality of blades are combined with a predetermined spacing, each of the first plurality of blades and the second plurality of blades secured via a fastener pin.

In one embodiment, the two-sided blade assembly can provide that each blade of the second plurality of blades includes a longer curving edge, the curving edge having an interior cutting radius of approximately 41 degrees. Further, each blade of the first plurality of blades can include a shorter curving edge, the shorter curving edge having an interior cutting radius of approximately 69 degrees.

In one embodiment, the first projecting side and the second projecting side include approximately 23 curved ends. Further, the first projecting side and the second projecting side can include approximately 15 curved ends, each curved end on the first projecting side being at least ⅜ths inch in length, and each curved end on the second projecting side being at least ⅝ths inch in length.

In one embodiment, the two-sided blade assembly includes a fastener pin coupled to each blade of the first plurality of blades and the second plurality of blades, the fastener pin coupled to each of the first plurality of blades and the second plurality of blades stationary via through a base portion of each blade. Also in the embodiment, the two-sided blade assembly can include a bracket including two opposing arms, each of opposing arms coupled to an end of the fastener pin. The bracket can include two opposing arms comprised of one or more of wood, metal and/or plastic. Coupled to the bracket, the two-sided blade assembly can include a handle coupled to the bracket, the handle formed of one or more of wood, plastic, rubber and/or a hardened gel. The handle can be configured to extend one or more of perpendicularly from the first plurality of blades, perpendicularly from the second plurality of blades, and/or in an opposing direction from the first plurality of blades or the second plurality of blades.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
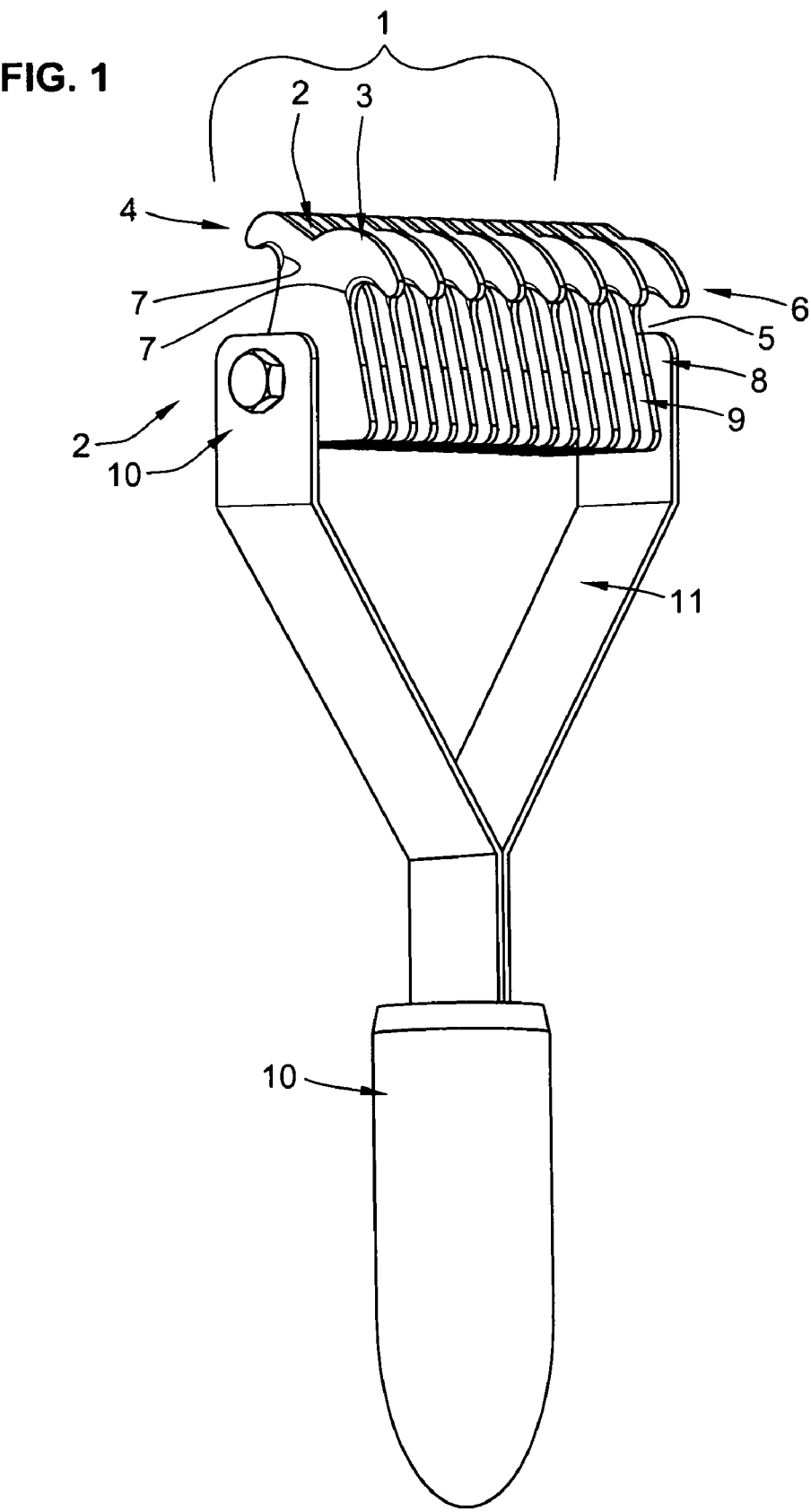
FIG. 1 is a side elevation showing the double-edged, more widely spaced curved metal blades protruding from a fixed interior metal pin running through slots in each blade in accordance with an embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

More specifically, the embodiments presented herein are directed to a bi-directional grooming tool. The bi-directional grooming tool advantageously includes singled-edged and double-edged blades configured in a first array interspersed with a second array to provide two grooming tools in one. Heretofore, tools using a curved blade design were available solely as single blades of a single length. Such tools were limited for use on medium and long coats. Even with blade assembly heads composed of more tightly spaced blades, the tip length prohibited the sharpened interior cutting plates from coming in contact with finer, shorter undercoats. In addition, for finer work on longer coats, i.e. removing matter in the coat such as burs etc., the user was required to buy more than one tool with a greater number of more tightly spaced blades. The present disclosure provides a single tool capable of performing a multitude of grooming tasks on all coat lengths.

With reference to FIG. 1, depicted is a perspective side view of a blade assembly 1, illustrating fifteen parallel metal blades. Eight blades are illustrated as being double-edged 2, with hook-shaped edges extending from opposite sides. Larger hook-shaped edges are illustrated on side 3, and a smaller and shorter hook-shaped edges 4, extending from the opposing side. Inserted between each double-edged blade 2, are single-edged blades 5, identical in shape to the shorter hook-shaped edges 4. The ends of each hook-shaped edge 4, 5 and 6, of each blade are rounded for safety and comfort. The view of highlights the side comprised of hooked ends 3, of the double-edged blades 2. The interior curve 7, is sharpened to aid in the efficiency of the main grooming tasks on medium to long coats, i.e. removing the undercoat, removing mats, and smoothing the overall coat.

In this embodiment, there are eight double-edged blades 2, producing a blade assembly ideally spaced apart to enable the tool to be combed through denser, longer coats without binding. By combing the tool with the direction of the hair growth, dead hair is gathered and gently pulled out by the use of the sharpened interior curve 7. Healthy hair is left intact. By combing sideways or backwards to the natural direction of hair growth a thinning effect can be achieved. Mats can be removed by repeated short drags.

The double-edged blades 2, are arranged in one row and anchored on a fixed cylindrical metal pin 8. Pin 8 can be inserted through each blade via a stamped corresponding hole 9, which is the same diameter as the cylindrical pin 8. The blades are affixed into position by metal spacers 10. Spacers 10 can be configured to be approximately one-eighth of an inch in width. The blade assembly 1, is fitted inside a metal bracket with splayed metal support arms 11. The blade assembly 1, is held stationary inside the metal bracket 11, by fasteners shown as exterior metal bolts 12. The metal bracket 11, is inserted into a molded handle 13. The handle 13, is shaped in the familiar form of a reversible brush or kitchen utensil, capable of being used in the same manner whether the tool is held with the shorter edged blades facing towards the coat or whether the longer-edged blades are towards the coat.

Figure 2:
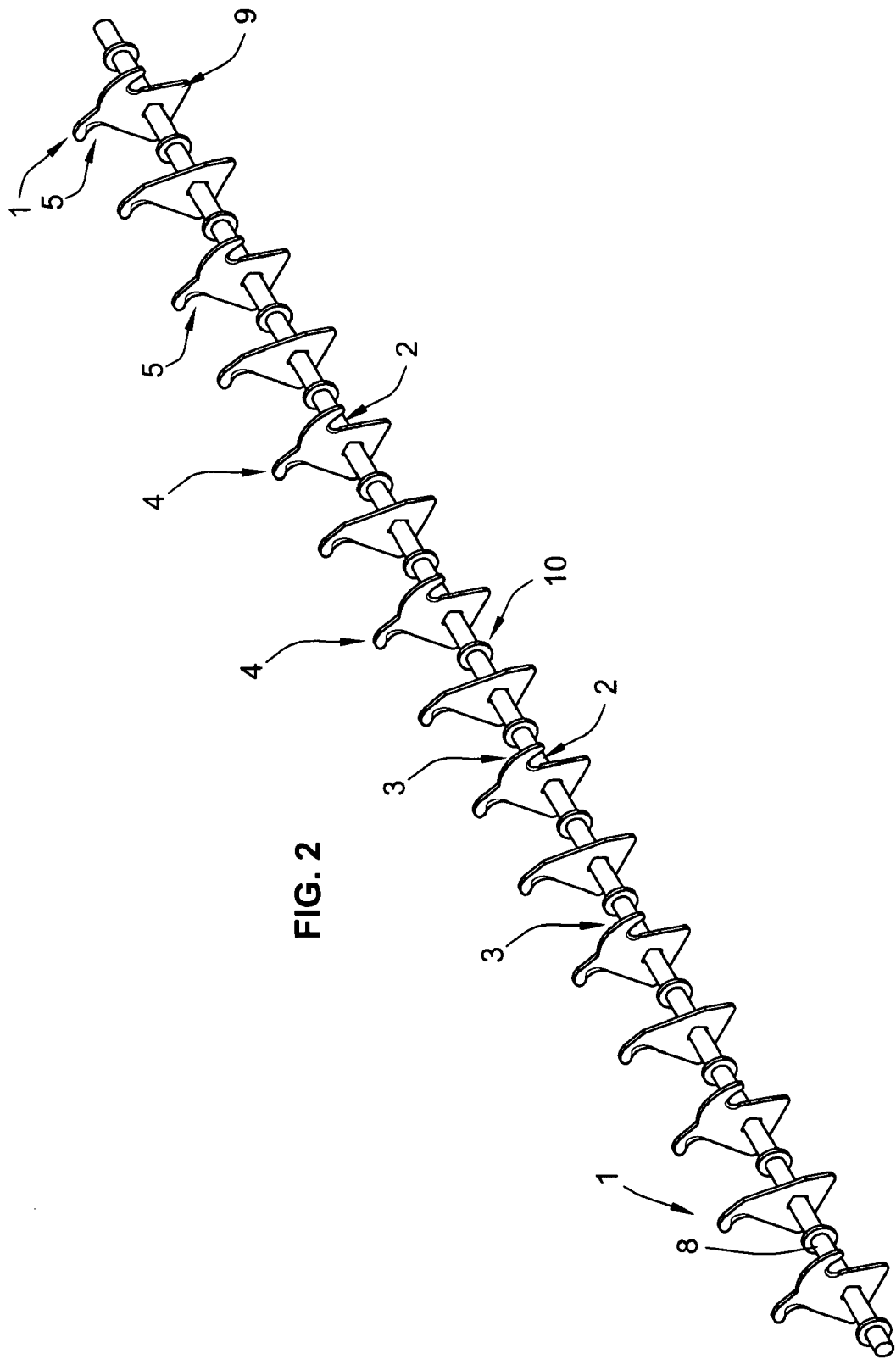
FIG. 2 is a cutaway elevation showing an exploded view of the configuration of a blade assembly comprised of opposing metal blades of two different designs each incorporating the use of a continuously curved interior cutting edge affixed to an interior pin running the length of the blades through openings in the bottom of each blade in accordance with an embodiment of the present invention.
Figure 3:
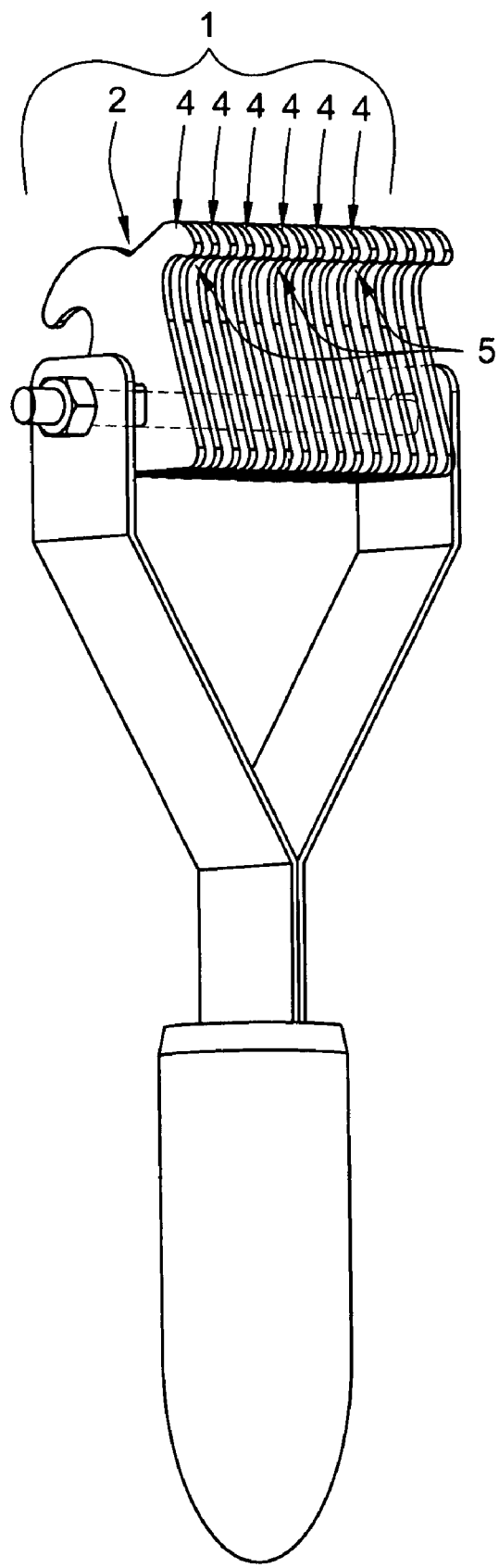
FIG. 3 is a side view showing the short-tined, more tightly spaced blades inserted between the double-tined blades in the opposing direction thus creating a two-sided device with the blades being held stationary by the use of metal spacers in accordance with an embodiment of the present invention.
Figure 4:
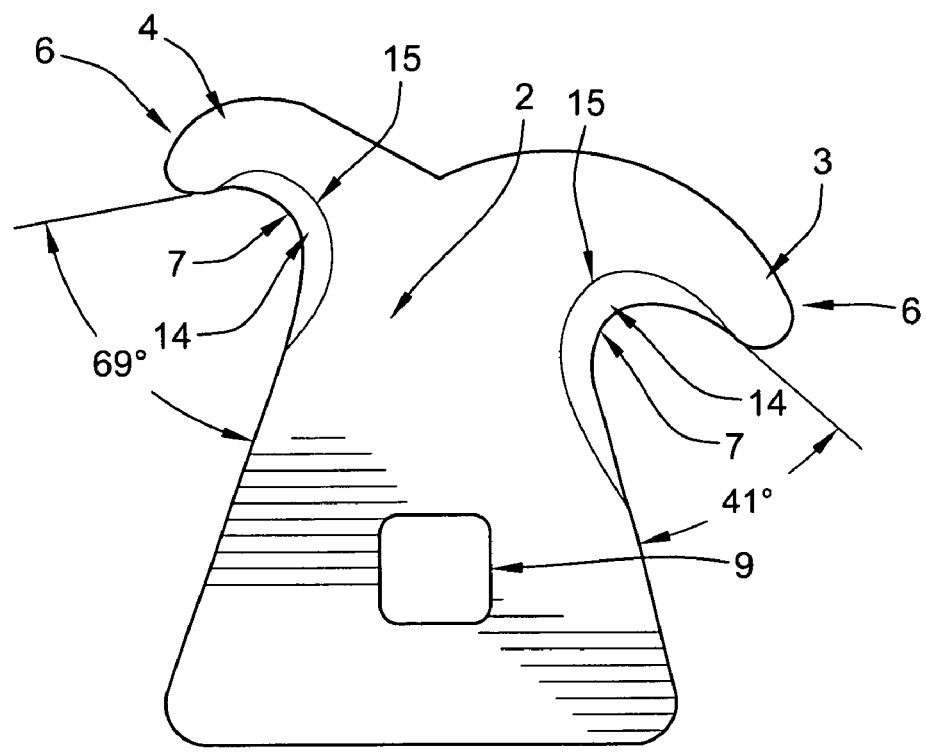
FIG. 4 shows a side view of a two-tined blade and the dimensions of the continuously curved interior cutting surface in accordance with an embodiment of the present invention.

Referring now to FIG. 2, illustrated is a cutaway showing the blade assembly 1, not to scale. The double-edged blades 2 can be configured with the aforementioned larger hook-shaped side 3, for use on medium and long coats, and the shorter hook-shaped edged side 4, for use on shorter coats. Inserted between each double-edged blade 2, is a single-sided shallower-tipped blade 5, which can be identical in depth and measurement to a shorter-side edge 4 of the double-edged blades 2. The cylindrical pin 8 can be inserted through a stamped hole 9, in the lower half of each blade. FIG. 2 further illustrates metal spacers 10, which can be configured to abut each blade creating the desired spacing for each side of the device. In this embodiment there are eight double-edged blades 2, and seven single-edged blades 5, thus producing 23 blades on each tool. One of ordinary skill in the art with the benefit of this disclosure will appreciate that the number of blades can vary according to requirements. FIG. 3 is a side perspective showing the eight short tines 4, of the double-tined blades 2, and the single-edged, short-tined blades 5, inserted between each double-tined blade 2. There are a total of 15 individual blades illustrated. The entire blade assembly 1, is approximately one and one-half inches wide. It could be lengthened to produce a tool for use on larger animals such as large breed dogs, horses, sheep, goats or farm animals. FIG. 4 is a side view of the double-tined blade 2, as assembled on FIG. 1. A double-angled cutting plate 14, is incorporated inside a continuously curved cutting area, 7.

Figure 5:
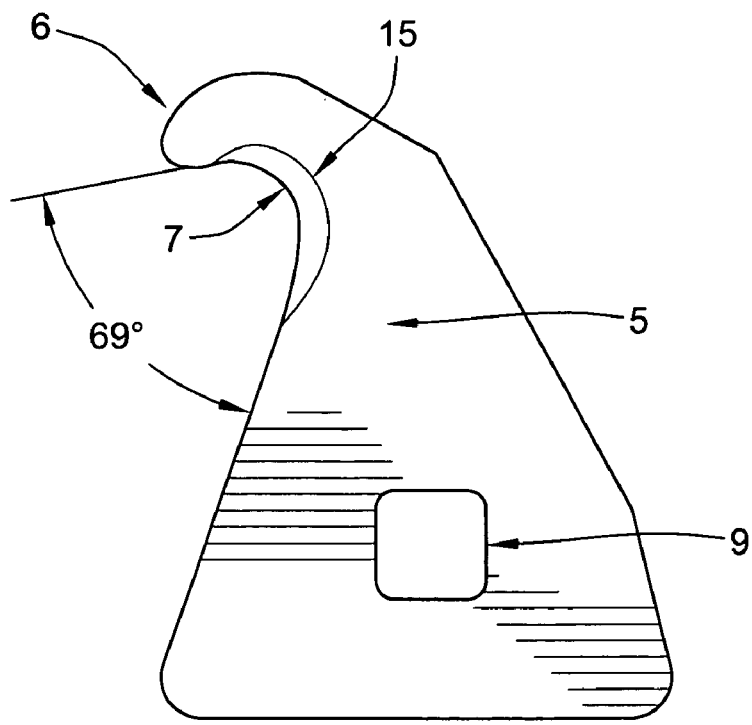
FIG. 5 shows a side view of the single-sided short-tined blade and the dimensions of the continuously curved interior cutting surface in accordance with an embodiment of the present invention.

Cutting curve 7 can begin approximately one-eighth of an inch behind the under portion of the rounded tip 6, to disallow any sharpened area from coming into contact with an animals' skin. The apex 15, of the curved cutting plates 14 is one-eighth of an inch in thickness on tine 3. The radius of the interior cutting surface 7, on tines 3, can be approximately 41 degrees. The apex 15, of the curved cutting plates 14 is slightly under one-eighth of an inch in depth on tine 4. The radius of the interior cutting surface 7, on tips 4, can be approximately 69 degrees. The long tines 4, are disposed at a lower latitude than short tines 3. FIG. 5 is a side view of a short-tined one-sided blade 5, as assembled in FIG. 3. The dimensions can be identical to the short tines 3, on the double-tined blades, 2. The radius of the interior cutting surface can be approximately 69 degrees. The apex 15, of the curved cutting plates 14, being slightly under one-eighth of an inch deep. The stamped slot 9, through which the cylindrical pin 8, can be inserted can be approximately one-eighth inch in diameter, which can be configured as a square opening or a circular opening or any matching shape to pin 8.

Figure 6:
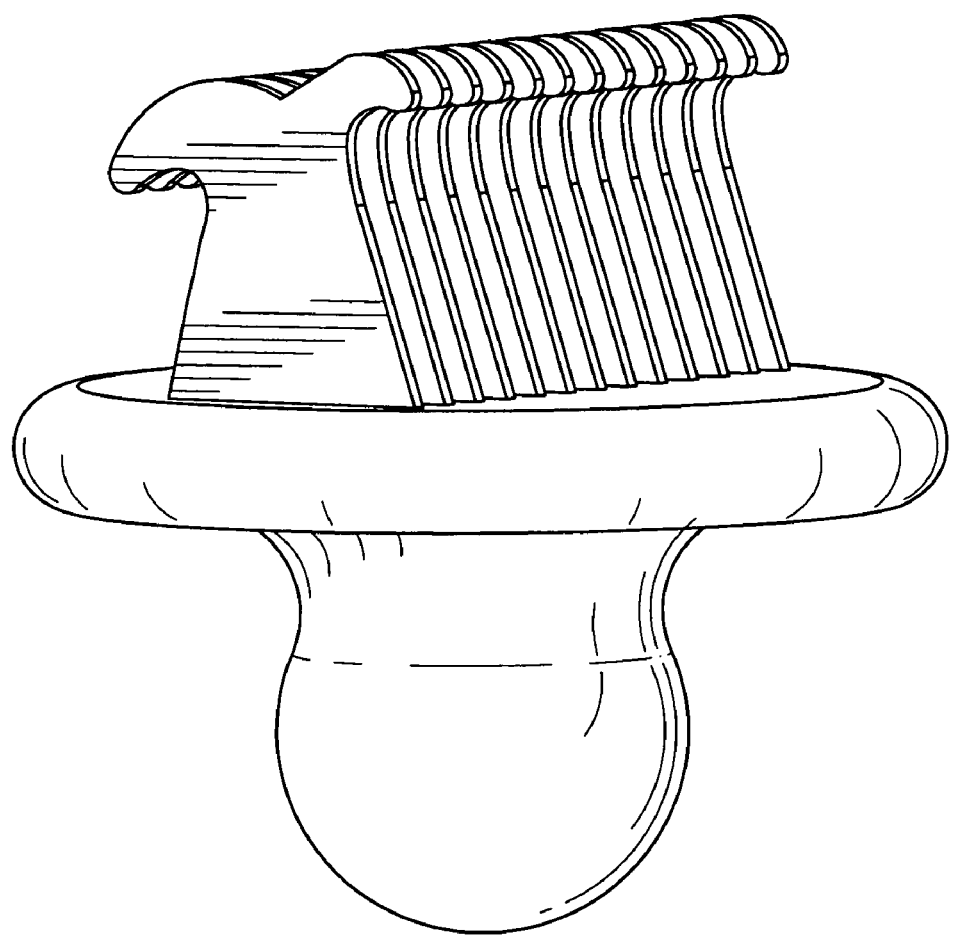
FIG. 6 shows a possible alternate interpretation of the blade assembly fixed inside a knob handle capable of being held between the fingers in accordance with an embodiment of the present invention.

Referring now to FIG. 6, a side view illustrates blade assembly 1 fixed onto a knob handle 16, capable of being held between the fingers and capable of being rotated for use of each side of the blade assembly.

Figure 7:
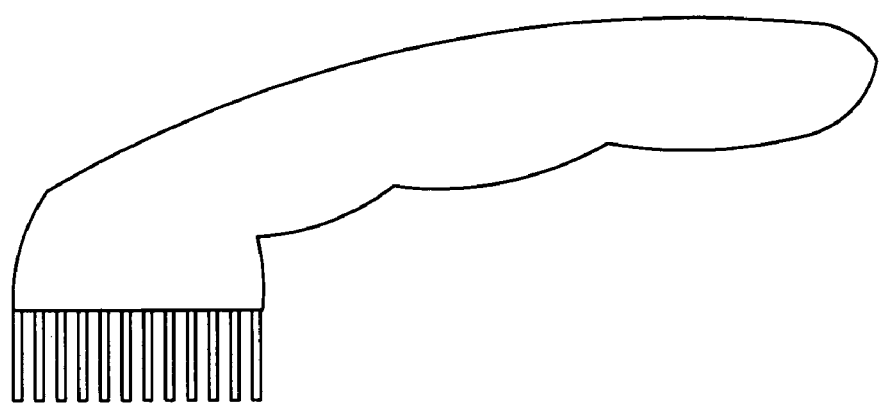
FIG. 7 shows a possible alternate interpretation of the blade assembly fixed inside a casing with a handle facing sideways in accordance with an embodiment of the present invention.

FIG. 7 is a frontal view of the blade assembly 1, fixed inside a casing extending onto a sideways handle 17.

Figure 8:
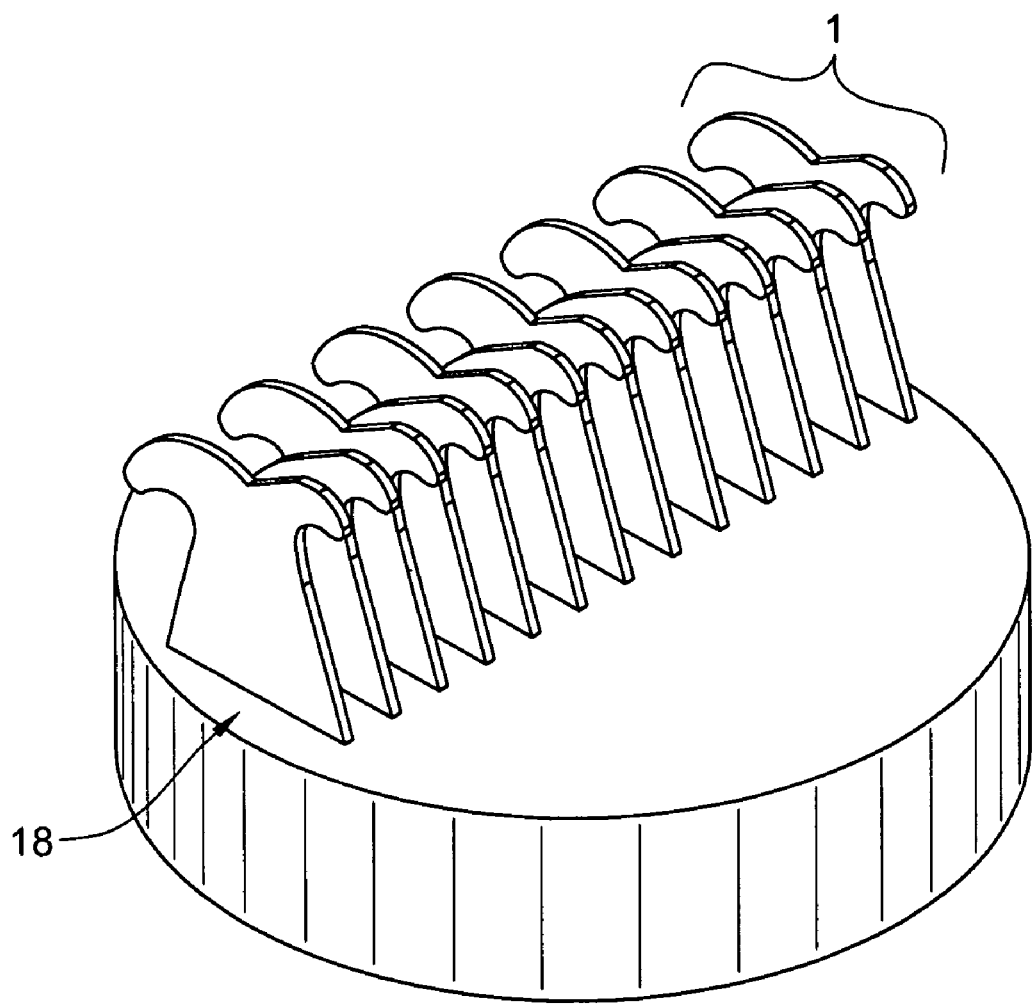
FIG. 8 shows an alternate interpretation of the blade assembly fixed onto a palm handle in accordance with an embodiment of the present invention.

FIG. 8 shows a perspective view of the blade assembly 1 fixed onto a palm handle 18.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. An apparatus for grooming the coats of fur-bearing animals, the apparatus comprising:
   a first array of single-edged parallel metal blades, each blade in the first array having rounded ends with a sharpened interior curve, each rounded end with sharpened interior curve being a cutting edge;
   a second array of parallel double-edged blades each with a sharpened interior curve in opposition, both arrays being fixably attached such that the first array and the second array are spaced such that each double-edged blade is adjacent to each single-edged blade to create a blade assembly; the blade assembly comprising a bracket including two opposing arms; and a handle removably coupled to the bracket.

2. The apparatus of claim 1 wherein the blades of the second array and the first array are directed toward opposing directions.

3. The apparatus of claim 1 wherein each blade has a sharpened interior curve comprised of two converging cutting segments, and each of the converging cutting segments has a sharpened apex.

4. The apparatus of claim 1 wherein the first array and the second array of metal blades are joined to form a single row.

5. The apparatus of claim 1 wherein one or more of the first array and the second array of metal blades includes a blade end of approximately three-eighths of an inch in length for use on short coats.

6. The apparatus of claim 1 wherein one or more of the first array and the second array of metal blades includes a blade end of approximately five-eighths of an inch in length for use on medium and long coat.

7. The apparatus of claim 1 wherein the first array and the second array are combined to enable substantially more shorter length blades of the first array to be combined with a matching shorter length end of the double-edged blades of the second array to allow an increased number of shorter length blades as compared to longer length blades of the blade assembly.

8. A two-sided blade assembly comprising:
   a first plurality of blades configured with interior cutting curves, the first plurality of blades including single-edged blades, each rounded end with sharpened interior curve being a cutting;
   a second plurality of blades coupled in opposition to the first plurality of blades such that each blade of the first plurality of blades is coupled to at least one of the second plurality of blades via a fastener, the second plurality of blades having a decreased number of blades as compared to the first plurality of blades and each blade in the second plurality of blades having double-edged cutting surfaces including a blade edge for a first shorter projecting side and a second blade edge cutting surface configured for an opposing second projecting side; the blade assembly comprising a bracket including two opposing arms; and a handle removably coupled to the bracket.

9. The two-sided blade assembly of claim 8 further comprising:
a plurality of spacers inserted between each blade of the first plurality of blades and the second plurality of blades.

10. The two-sided blade assembly of claim 8 wherein the first plurality of blades and the second plurality of blades are combined with a predetermined spacing, the first plurality of blades and the second plurality of blades being secured via the fastener.

11. The two-sided blade assembly of claim 8 wherein each blade of the second plurality of blades includes a longer curving edge, the curving edge having an interior cutting arc defined between an end of the of the longer curving edge and a base of the blade of approximately 41 degrees.

12. The two-sided blade assembly of claim 8 wherein each blade of the first plurality of blades includes a shorter curving edge, the shorter curving edge having an interior cutting arc defined between an end of the of the longer curving edge and a base of the blade of approximately 69 degrees.

13. The two-sided blade assembly of claim 8 wherein the first projecting side and the second projecting side include approximately 23 curved ends.

14. The two-sided blade assembly of claim 8 wherein the first projecting side and the second projecting side include approximately 15 curved ends, each curved end on the first projecting side being at least $3/8$ths inch in length, and each curved end on the second projecting side being at least $5/8$ths inch in length.

15. The two-sided blade assembly of claim 8 further comprising:
the fastener coupled to each blade of the first plurality of blades and the second plurality of blades, the fastener coupled to each of the first plurality of blades and the second plurality of blades via connection to a base portion of each blade of the first plurality of blades and the second plurality of blades; and
a bracket including two opposing arms, each of opposing arms coupled to an end of the fastener pin.

16. The two-sided blade assembly of claim 15 wherein the bracket including two opposing arms is comprised of one or more of wood, metal or plastic.

17. The two-sided blade assembly of claim 15 further comprising:
a handle coupled to the bracket, the handle formed of one or more of wood, plastic, rubber or a hardened gel.

18. The two-sided blade assembly of claim 17 wherein the handle is configured to extend one or more of perpendicularly from the first plurality of blades, perpendicularly from the second plurality of blades, or in an opposing direction from the first plurality of blades or the second plurality of blades.

* * * * *